United States Patent [19]
Shibuya et al.

[11] Patent Number: 5,056,070
[45] Date of Patent: Oct. 8, 1991

[54] TIMER PROGRAMMING APPARATUS

[75] Inventors: Kenichi Shibuya; Hirotsugu Okubo, both of Tokyo; Yukio Furudate, Kanagawa, all of Japan

[73] Assignee: Sony Corporation, Tokyo, Japan

[21] Appl. No.: 360,420

[22] Filed: Jun. 2, 1989

[30] Foreign Application Priority Data

Jun. 6, 1988 [JP] Japan .................................. 63-139069
Jun. 8, 1988 [JP] Japan .................................. 63-141368

[51] Int. Cl.$^5$ ...................... G04B 47/00; H04N 5/782; G11B 31/00
[52] U.S. Cl. ...................................... 368/10; 358/335; 360/33.1
[58] Field of Search ............................. 368/10, 28–29, 368/107–115; 358/335, 191.1, 194.1; 360/10.1, 14.1, 33.1

[56] References Cited

U.S. PATENT DOCUMENTS

| | | | |
|---|---|---|---|
| 4,573,127 | 2/1986 | Korff | 364/493 |
| 4,641,205 | 2/1987 | Beyers, Jr. | 360/33.1 |
| 4,786,982 | 11/1988 | Wakahara et al. | 360/33.1 |
| 4,866,542 | 9/1989 | Shimada et al. | 360/10.3 |

FOREIGN PATENT DOCUMENTS 2079555 1/1982 United Kingdom .

Primary Examiner—Vit W. Miska
Attorney, Agent, or Firm—Lewis H. Eslinger; Jay H. Maioli

[57] ABSTRACT

A timer apparatus in which a stored reservation date to record a program and the present date are compared and when the reserved date is past the present date the reserved date is automatically changed to the nearest future date of the same day of the week, so that user efforts are simplified and required memory space is decreased. When it is necessary to make a change in the date or day of the week being displayed, by repeating a plurality of selected display patterns within a predetermined time period it appears to the user that the date or the day of the week is being continuously and sequentially changed at a high speed, whereas only the selected patterns are being sequentially displayed.

15 Claims, 6 Drawing Sheets

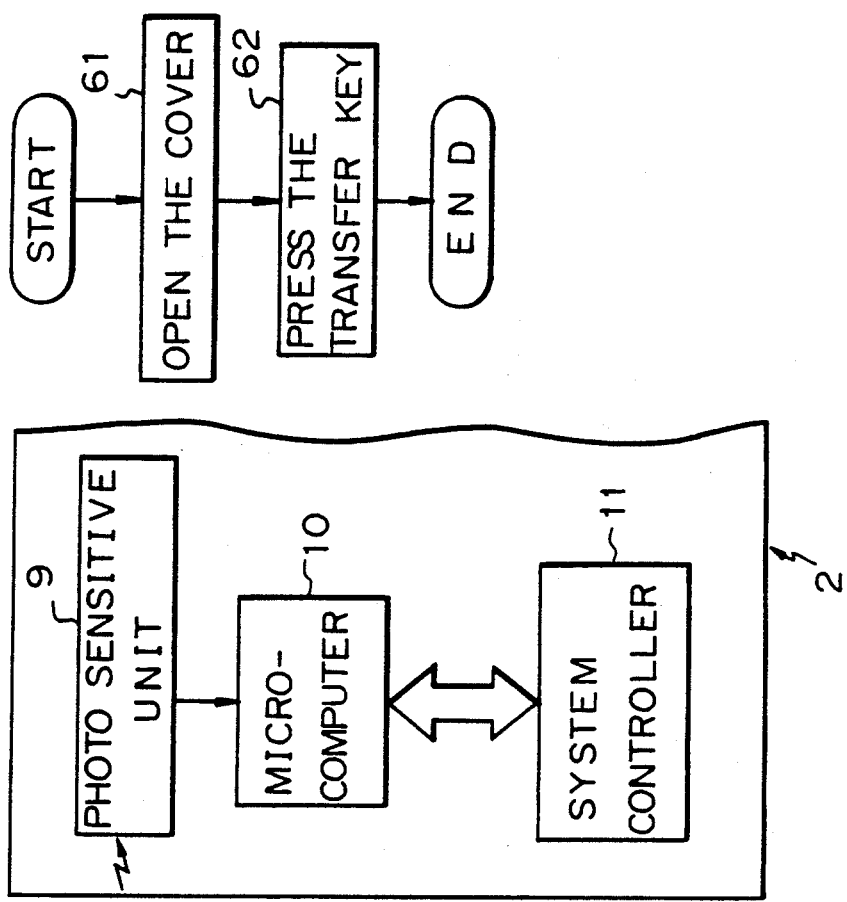
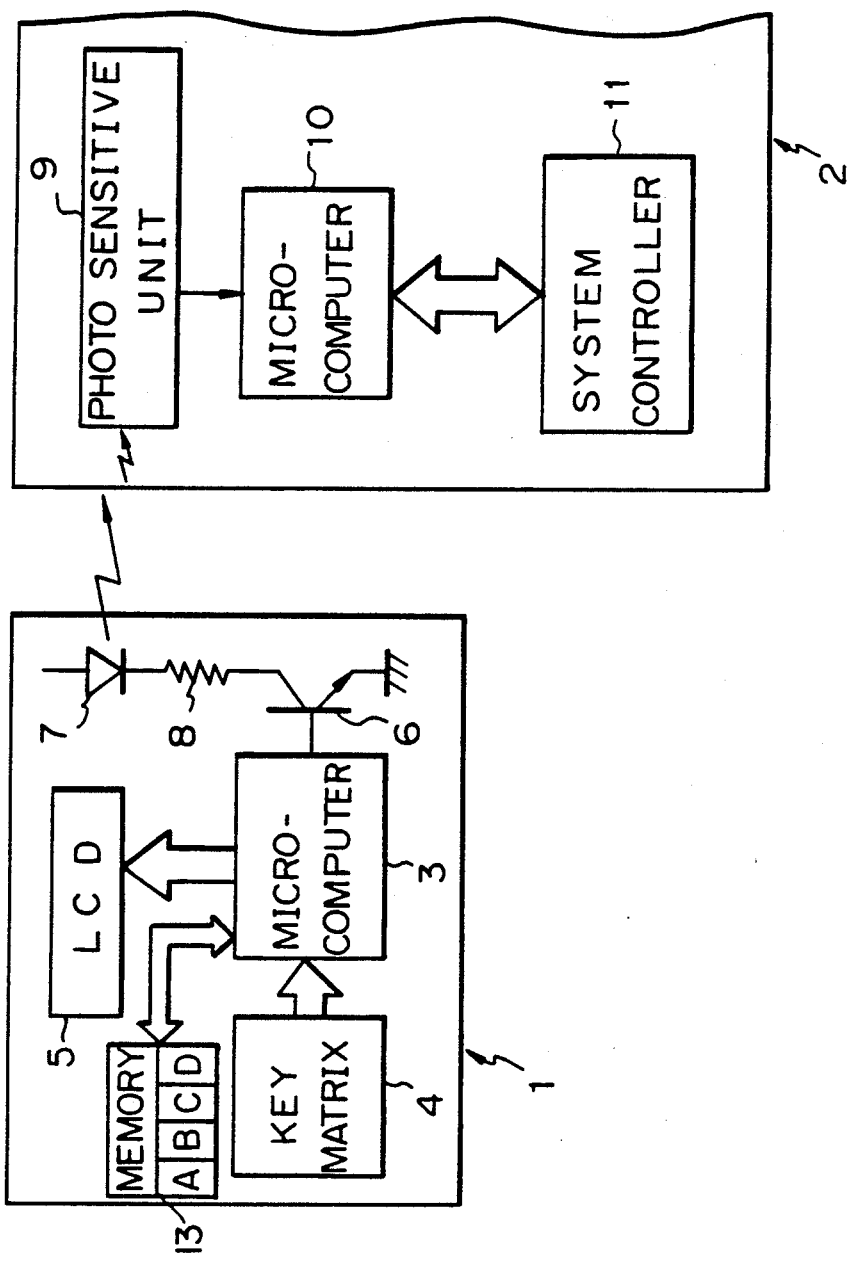

Fig. 8A
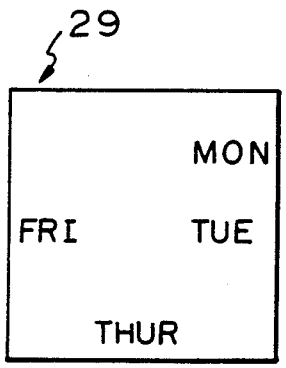
Fig. 8B
Fig. 8C
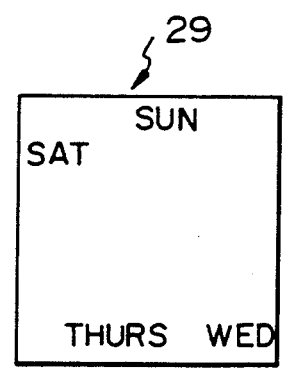
Fig. 8D
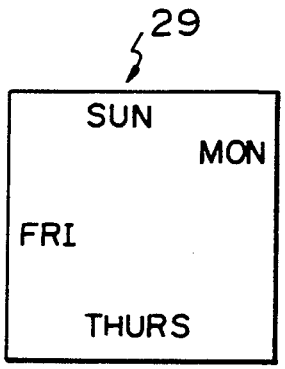
Fig. 8E
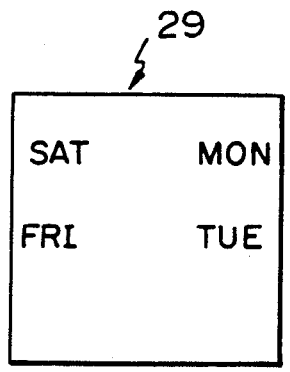
Fig. 8F
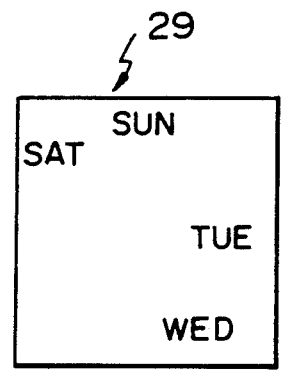
Fig. 8G
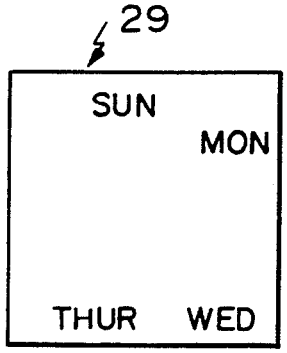

TIMER PROGRAMMING APPARATUS

BACKGROUND OF THE INVENTION

1. Field of the Invention

This invention relates generally to a timer apparatus and, more particularly, to a timer for programming a video tape recorder using a wireless remote control unit.

2. Description of the Background

Some video tape recorders (VTRs) have the capability of programming or reserving the time for recording desired TV programs using a wireless remote control unit that has a transmitter for transmitting the programming information to the VTR and that also has a memory backup capability. In such systems, because the recording reservation data is retained in the memory of the wireless remote control unit using the memory backup, in the case of retransmitting record programming or reservation data having a similar content, the old recording reservation data can be updated and used. For instance, when reserving the recording of two TV programs such as:

(1) April 14, 18:00 to 19:00, Channel 2
(2) April 17, 18:00 to 19:00, Channel 2 the reservation data for the program corresponding to April 14 (1) is transmitted first. Then, the wireless remote control apparatus is set into the correcting or updating mode, and the date of April 14 is corrected to the date of April 17 by operating the keys of the remote control unit, and the data for the program corresponding to April 17 (2) is transmitted to the VTR.

In many cases, TV programs are broadcast on a once a week basis, so that some VTRs have a function known as "every week reservation." In the case of reserving the same program every week, such desired TV program can be recorded every week by inputting the recording reservation data with respect to the day of the week, start time, recording time, end time, channel, and the like into a main memory provided in the VTR.

In a VTR of the kind in which the recording programming is entered using the wireless remote control unit described above, although the recording reservation data is kept in the memory by means of the memory backup, when the reservation is again newly executed there is a problem such that the old recording reservation data must be corrected or updated and new recording reservation data must be set again by operating the keys of the remote control unit.

On the other hand, in the VTRs described above in which the so-called every week reservation capability is provided, although a desired program can be automatically recorded every week there is the problem that once the every week reservation has been set a part of the memory area in the main memory in the VTR is always occupied with the every week reservation data. On the other hand, some users do not need, or do not want, to utilize the every week reservation capability. In such a case, there is a problem that if the function of the every week reservation is not used, complicated recording operations or recording programming operations must be executed by the user.

Thus, in the case of updating or again reserving the recording reservation data, the operating efficiency of the apparatus is diminished in both cases.

On the other hand, when a new unit, such as a VTR, having the timer function is initially purchased, the current date is ordinarily set, and in the case where the date is digitally displayed by a segmented display device of the kind that is controlled by a microcomputer, the current date is set by sequentially changing the display at a high speed.

The following operations have been known for use in digitally displaying the numerals of the date that is being changed at a high speed:

(1) All the correct numerals are displayed in sequence, however, the display time is reduced to as short a time as possible, and the number of display times is increased.

(2) The numerals are thinned out, that is, not all of the numerals are displayed.

In the case where the numerals that are periodically changed at a high speed are digitally displayed by method (1) above, there are problems in that although the correct numerals that follow the actual sequential count values are displayed, the processing time of the microcomputer is devoted solely to processing the display of the numerals, so that other important processes cannot be executed, and also the display time of each individual number is so short that it is difficult for the eye to follow and monitor the changing numbers.

On the other hand, in the case of digitally displaying the numerals using method (2) above, there is a problem that although the microcomputer can easily execute the other important processes because the number of display times is reduced, the quantity of numerals being displayed is so reduced that the display becomes unnatural so that the changing numerals are also difficult for the operator to monitor.

OBJECTS AND SUMMARY OF THE INVENTION

Accordingly, it is an object of the present invention to provide a timer apparatus for use in programming a VTR that can overcome the above-noted defects inherent in systems known and proposed heretofore.

It is another object of the present invention to provide a timer apparatus that can automatically update the recording reservation date in a VTR each time such updating is required.

It is a further object of the present invention to provide a timer apparatus in which a microcomputer can not only display the date and the day of the week but also execute the other data processing operations as required, and in which the date and the day of the week are changed at a fast rate and displayed without unnatural appearance to the user.

In accordance with an aspect of the present invention in a timer apparatus, a recording reservation date is stored and compared with the current date, and when the reservation date is older than the current date, the reservation data is changed to the nearest future date of the same day of the week. That is, the reservation date stored in a reservation setting memory is read out, the current date is read out from a preset calendar, and the reservation date and current date are compared. When the reservation date is older than the current date, the current date is changed to the nearest future date of the same day of the week as the reservation day and the updated date is set to be the new reservation date. In this fashion, the old reservation date stored in the memory is automatically updated to the new reservation date.

On the other hand, when the reservation date stored in the reservation setting memory and the current date are compared, and the reservation date is the same as the current date or the reservation date is earlier than the current date, the reservation date stored in the reservation setting memory is retained as it is.

According to another embodiment of the present invention, in a timer apparatus having a date display section of the segmented kind and an annular or ring-like style display section for the day of the week, by repeating a plurality of display patterns at predetermined periods to display the date or the day of the week, the date or the day of the week can be observed as if it were changed at a high speed. That is, in the timer apparatus having the segmented type display for the date and the annular display for the day of the week, respectively, a plurality of abstract display patterns are selected and sequentially displayed based upon considerations of visual acuity characteristics. Such display patterns are sequentially displayed in the date display section at a high speed and with a predetermined period. To display the day of the week, only a part of the numerals for a day of the week is displayed and a plurality of patterns of these less-than-whole numerals are set based on visual characteristic considerations. Selected patterns of the annular day of the week display are also sequentially displayed in the corresponding display section at a high speed and with a predetermined period. Thus, the date and the day of the week can appear to the observer as if they are continuously and sequentially changed at a high speed, whereas each element of the sequence is not actually displayed.

The above and other objects, features, and advantages of the present invention will become apparent from the following detailed description and accompanying drawings, in which like reference numerals represent the same or similar elements.

BRIEF DESCRIPTION OF THE DRAWINGS

FIG. 1 is a schematic in block diagram form of a remote control unit and a video tape recorder advantageous for use with an embodiment of the present invention;

FIG. 6 is a flowchart useful in explaining an operation of an embodiment of the present invention;

FIGS. 8A-8G are pictorial representations of the day of the week display in accordance with an embodiment of the present invention.

DETAILED DESCRIPTION OF PREFERRED EMBODIMENTS

Figure 2:
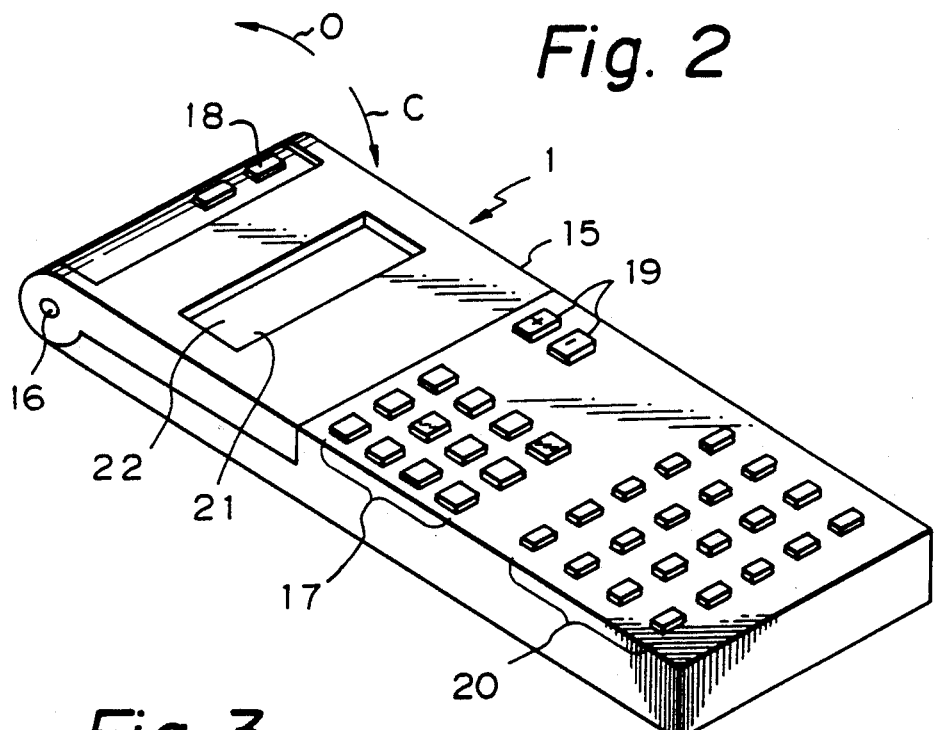
FIG. 2 is a perspective view of a wireless remote control unit.

In the embodiment shown in FIGS. 1 to 6, the invention is applied to a wireless remote control unit or transmitter for controlling a VTR, and such embodiment will be described in accordance with the following schedule:

(A) Remote control unit and outline of the operation of the VTR by the remote control unit;

(B) Description of the operation using flowcharts;
(C) Description of the display patterns; and
(D) Description of the date setting operation using the remote controller.

(A) Outline of the operation of the VTR using the remote control unit.

In FIG. 1 a wireless remote control unit 1 transmits information to a VTR 2 by converting recording reservation dates, various kinds of mode signals, and the like into infrared signals and transmitting them to VTR 2 by the operator manipulating the appropriate keys. A calendar is set in remote controller 1 by an internal microcomputer 3, used for only the wireless remote control transmitter, or by a table in a memory 13 in remote control unit 1.

In FIG. 1, microcomputer 3 operates on the basis of instructions that are output from a key matrix 4 upon operation by the user of various kinds of keys that are explained in detail hereinbelow. For example, on the basis of the above instructions, microcomputer 3 outputs the data stored in the memory 13 of microcomputer 3 to a liquid crystal display (LCD) section 5 for displaying the data to the user, or microcomputer 3 outputs the result of an arithmetic operation executed by microcomputer 3 to LCD section 5 for display. Further, when the transmitting mode is set by operating the appropriate key, microcomputer 3 operates to transmit recording reservation data, mode signal, and the like from remote controller 1 to VTR 2 on the basis of a signal transmission instruction. That is, based on the transmission instruction from key matrix 4 microcomputer 3 turns on a driver 6, which can comprise transistor, to allow a light emitting diode (LED) 7 to convert the recording reservation data, mode signal, and the like into infrared radiation for output. A current limiting resistor 8 is in series between transistor 6 and LED 7.

The infrared signal which is output by LED 7 of remote controller 1 is detected by a photo sensitive unit 9 of VTR 2 and is converted into an electric signal and amplified. The electric signal is then supplied to another microcomputer 10 in VTR 2. Microcomputer 10 functions as a decoder to convert the electric signal supplied by photo sensitive section 9 into a signal that can be easily operated on by a system controller 11. In other words, the electric signal from photosensitive unit 9 is converted into the recording reservation data, mode signal, and the like by microcomputer 10 and supplied to system controller 11.

System controller 11 stores the recording reservation data and controls VTR 2 so as to record the desired TV program being transmitted at the date, time, and channel, which were designated by the recording reservation data. After completion of the recording of the TV program, the recording reservation data held in system controller 1 is erased. A calendar is also set in VTR 2 in a manner similar to the manner in which the calendar was set in remote control unit 1.

In remote control unit 1 shown in FIG. 2, a cover 15 covers the upper portion of remote control unit 1 and is rotatable in the directions shown by arrows O and C about a hinge axis 16. Remote control unit 1 also includes number keys 17 corresponding to the numerals 1 to 12; an on/off key 18 to control an internal power supply of remote control unit 1; channel change keys 19; and various other kinds of control keys, shown generally at 20.

Figure 3:
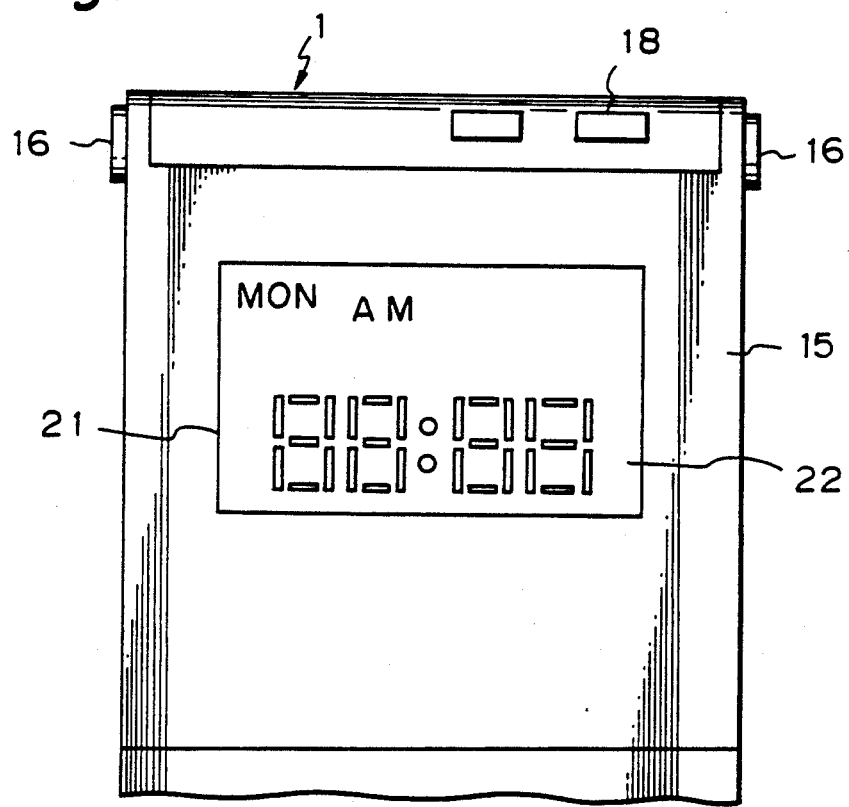
FIG. 3 is a plan view, partially enlarged, of an upper portion of the remote control unit of FIG. 2.

When cover 15 is closed, as shown in FIG. 3, the current day of the week, time, AM/PM, and the like are displayed and can be seen through an opening 21 provided in cover 15. This display is provided even if on-/off key 18 is actuated to the off position. Ordinary mode signals other than the recording reservation setting mode signal for VTR 2 can be transmitted from remote control unit 1 regardless of the opened/closed state of cover 15.

Figure 4:
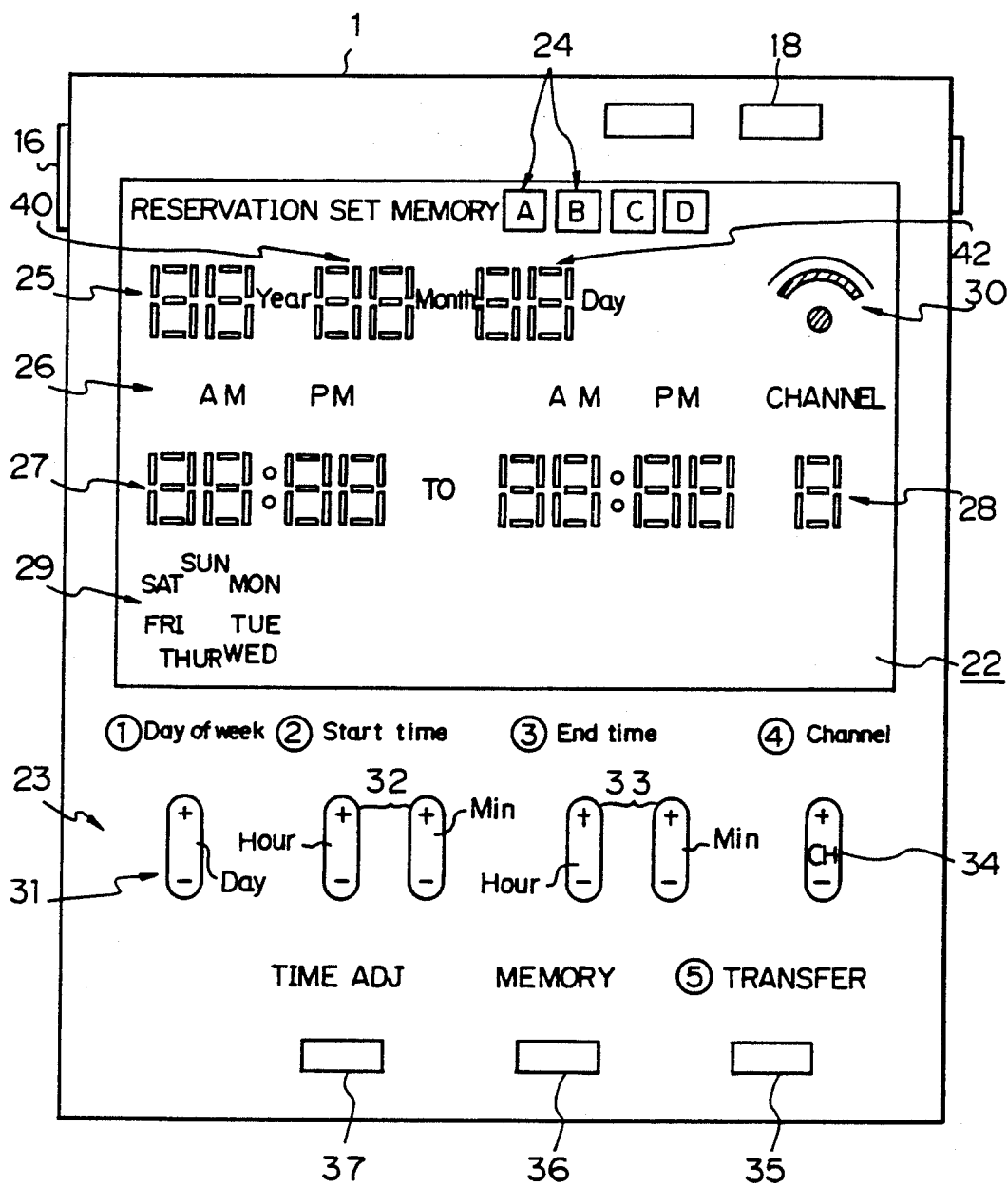
FIG. 4 is an enlarged plan view of a liquid crystal display section and reservation setting keys of the remote control unit of FIG. 2.

The upper portion of remote control unit 1 is shown in FIG. 4 when cover 15 has been opened by rotating it in the direction of arrow O in FIG. 2. As shown in FIG. 4, a liquid crystal display (LCD) section 22 and recording reservation setting keys 23 are provided in the portion of remote control unit 1 corresponding to cover 15. LCD 22 displays the recording reservation data and includes: a memory display section 24; a year/month/day display section 25; an AM/PM display section 26; a time display section 27; a channel display section 28; a day of the week display section 29; and a transfer display section 30. Recording reservation setting keys 23 comprise: a day/day of the week key 31; start time keys 32; end time keys 33; a channel key 34; a transfer key 35; a memory key 36; and a time adjusting key 37.

When cover 15 is opened in the direction of the arrow O in FIG. 2, remote control unit 1 is automatically set to the recording reservation setting mode. Time display section 27 and channel display section 28 are set to the state in which only one display segment, usually the center segment, is energized in each of the display sections. At this time, the day's date is displayed in the year/month/day display section 25 on the basis of the calendar that has been already set in remote control unit 1.

When the recording reservation setting mode has been set by opening cover 15, if the user wants to change the previous recording reservation date held in a memory, for instance, in a reservation setting memory A, to the nearest future date from the present day corresponding to the same day of the week, the user first presses memory key 36. The nearest future date from the present day corresponding to the same day of the week as that of the past recording reservation date will then be set by internal processes that will be explained in detail below. The new recording reservation date and the day of the week are then displayed in yea/month/day display section 25 and day of the week display section 29, respectively. The same data as the past data is also displayed in the other AM/PM display section 26, time display section 27, channel display section 28, and the like, without change. The new recording reservation data is then stored in the reservation setting memory A just as the previous reservation dates.

When transfer key 35 is depressed, a transfer indication is displayed by transfer display section 30 and the recording reservation setting mode signal, recording reservation data, and the like are transmitted from remote control unit 1 to VTR 2. The infrared signal from remote control unit 1 is decoded by microcomputer 10 in VTR 2 and supplied to system controller 11. System controller 11 stores the above recording reservation data and controls VTR 2. Thus, the TV program is recorded at the designated day, time, and channel. After completion of the recording of the designated TV program, the recording reservation data held in system controller 11 of VTR 2 is erased.

As described above, according to this embodiment the old or previous recording reservation date can be updated to the new recording reservation date by an extremely simple, uninvolved operation, whereby cover 15 is opened and memory key 36 is pressed, so that the complicated operations required in the conventional correcting operation are substantially reduced. In addition, by repeating this operation as desired, the recording can be reserved every week. Furthermore, because the program recording reservation data is erased simultaneously with the completion of the recording, the situation in which a part of the memory area in the main memory in VTR 2 is always occupied, as in the conventional case of using the every week reserving function, is eliminated.

In the case where the user wants to record a TV program different than the TV program ordinarily recorded, new recording reservation data (month, day, start time, end time, channel, day of the week) is set by operating the appropriate keys among day/day of the week key 31 start time keys 32, end time keys 33, and channel key 34. The new recording reservation data may be stored in the reservation setting memory A for example.

Next, when transfer key 35 is pressed, the transfer indication is displayed in transfer display section 30 and the recording reservation setting mode signal, recording reservation data, and the like are transmitted from remote control unit 1 to VTR 2.

In VTR 2, the infrared signal from remote control unit 1 is decoded by microcomputer 10 and supplied to system controller 11 which stores the recording reservation data and controls VTR 2 accordingly. The TV program at the reserved day, time, and channel is recorded and after completion of the recording of the TV program, the recording reservation data in system controller 11 is erased.

Reservation setting memories A to D are switched by the user pressing memory key 36, and each time memory key 36 is pressed the reservation setting memories are switched in accordance with the order of A to B to C to D back to A. The display of memory display section 24 is also sequentially switched in correspondence to the switching of the memories. Thus, the recording reservation data recorded in the reservation setting memories A to D can be updated.

When the plus (+) end portion is pressed by the user in each of day/day of the week key 31, start time keys 32, end time keys 33, and channel key 34, the numerals in year/month/day display section 25, time display section 27, and channel display section 28 increase. On the other hand, when the minus (−) end portion is pressed, the numerals in display sections 25, 27, and 28 decrease.

Time adjusting key 37 is used to display the current time which has been set in remote control unit 1 . When transfer key 35 is pressed after time adjusting key 37 was pressed, the current time set in remote control unit 1 is displayed on VTR 2.

(B) Description of operation using flowcharts

Figure 5:
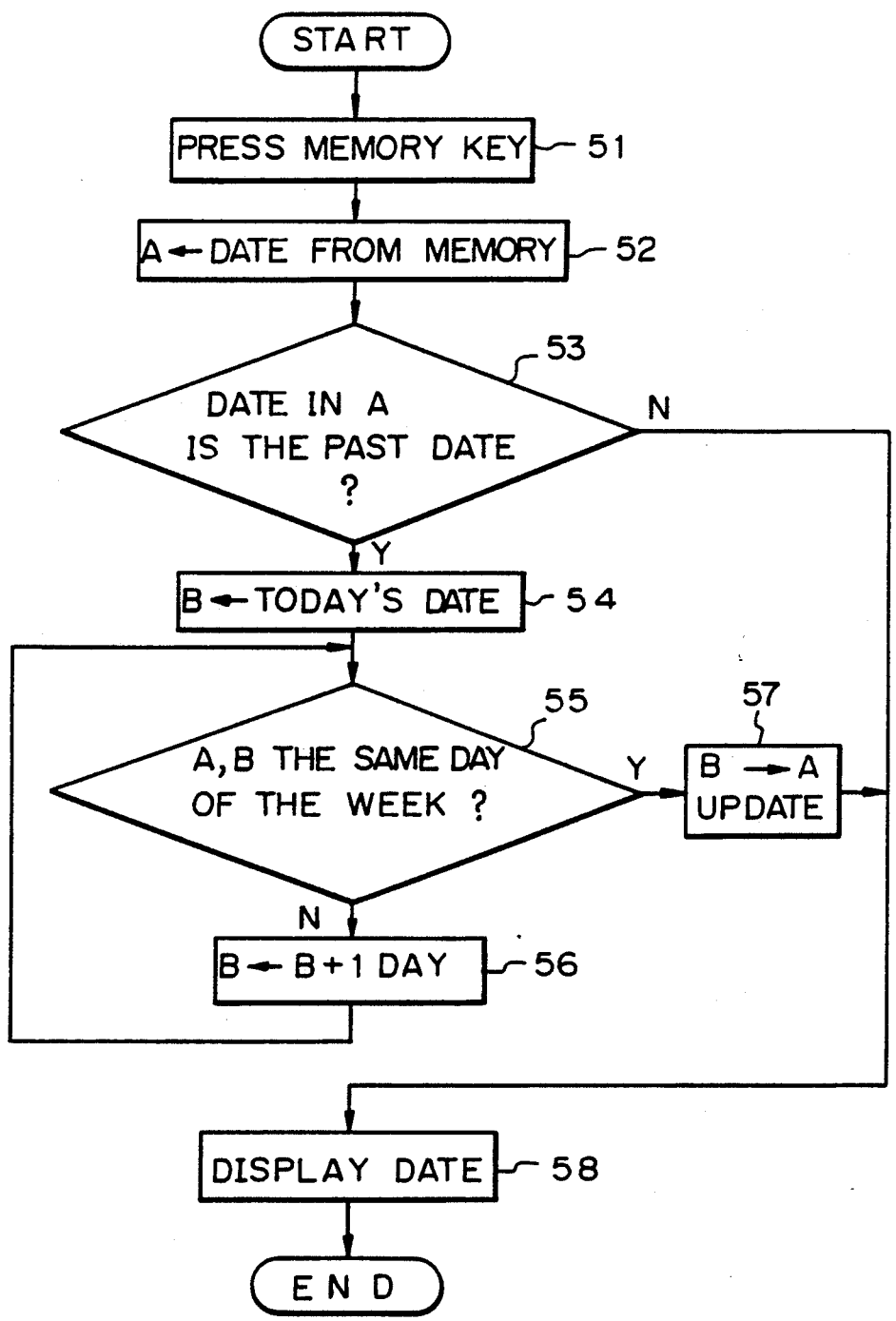
FIG. 5 is a flowchart useful in explaining an operation of an embodiment of the present invention.
Figure 7A:
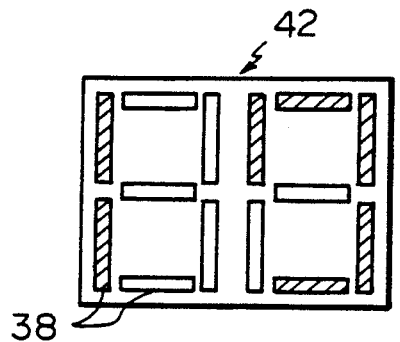
FIGS. 7A-7G are pictorial representations of the date display in accordance with an embodiment of the present invention.
Figure 7B:
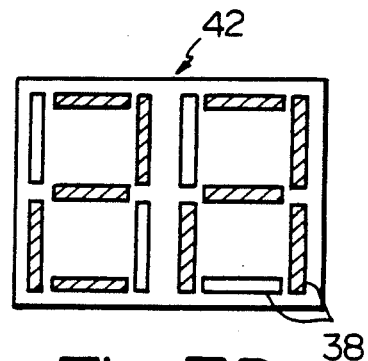
Figure 7C:
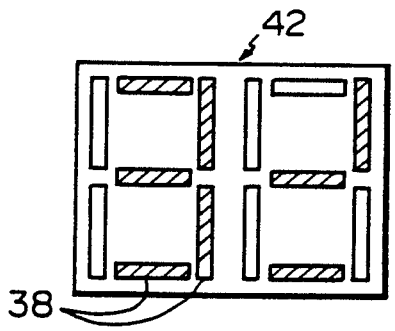
Figure 7D:
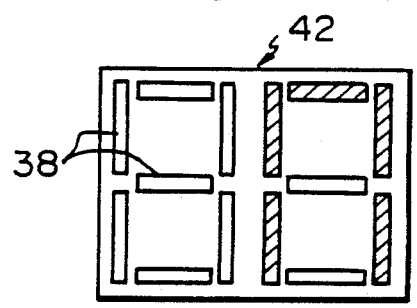
Figure 7E:
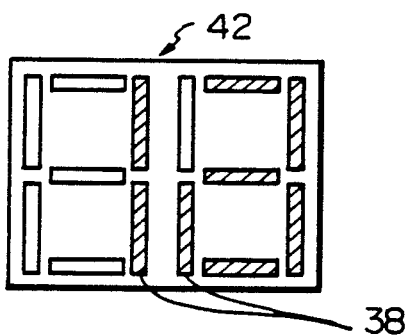
Figure 7F:
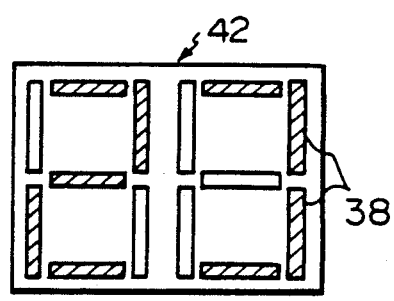
Figure 7G:
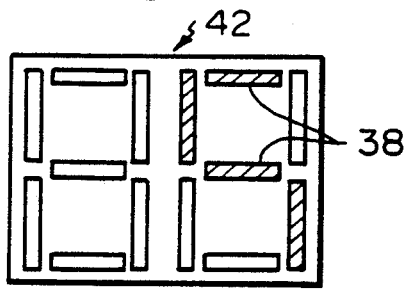

FIG. 5 shows a method for the automatic updating of the date, and FIG. 6 shows a method of transmitting recording reservation data.

In FIG. 5, when cover 15 of remote control unit 1 is opened and memory key 36 is pressed in step 51, the date, for instance, June 3, is read out of the memory, the reservation setting memory A of microcomputer 3 in remote control unit 1, for example, and substituted for a variable A, as shown step 52. At this time, the day of the week corresponding to the above date is also read out of the calendar that had been previously set in remote control unit 1.

Next, in step 53 a check is made to determine whether the date substituted for the variable A is the past date or not. That is, today's date, for instance, June 8, is read out of the calendar set in remote control unit 1 and is compared with the date set as variable A, thereby determining whether the date set as variable A is the past date or not. In this case, because the date of the variable A is the past date, the method proceeds to step 54, however, if the date of variable A is the current date or a future date then the procedure moves to step 58.

Assuming that A is a past date, in step 54 today's date and the day of the week (June 8, Wednesday) are read out on the basis of the calendar and substituted for the variable B, after which step 55 follows. In step 55, the days of the week of the dates substituted for the variables A and B are compared. In this example, the variable A denotes Friday and the variable B denotes Wednesday. If the days of the week differ, the method proceeds to step 56, however, if the days of the week are the same, the method proceeds to step 57.

In step 56, one day is added to variable B to set a new value of variable B, the day of the week is also changed to correspond to the new date, and the process is returned to step 55. The loop of steps 55 and 56 is repeated until the day of the week of the date of variable B is equal to the day of the week of the date of variable A. In this example, the foregoing steps are repeated until the day of the week of the variable B changes from Wednesday to Friday. When the date and the day of the week of the variable B are finally set to June 10 (Friday), the day of the week of the date of the variable A and the day of the week of the date of the variable B are determined to be equal, and method moves to step 57. In step 57, the date (June 10) of variable B is stored in the reservation setting memory A and the method moves to step 58. In step 58, the date and the day of the week (June 10, Friday), which were newly stored in the reservation setting memory A in step 57, are displayed by LCD 22 together with the other recording reservation data and the method is finished.

Next, the recording reservation data is transmitted to VTR 2 in accordance with the method represented in the flowchart of FIG. 6. The above display can be executed not only by remote control 1 but also by VTR 2. FIG. 6 represents a procedure to transmit recording reservation data from remote control unit 1 to VTR 2, in which in step 61 cover 15 of remote control unit 1 is opened and transfer key 35 is then pressed in step 62. An indication of this data transfer is displayed by transfer display section 30 of LCD 22.

On the other hand, the recording reservation data set by remote control unit 1 is transmitted to VTR 2 together with the recording reservation setting mode signal, so that in VTR 2, the recording reservation data is input to system controller 11 through microcomputer 10 and the recording reservation of the desired TV program is completed.

In this embodiment, a discrimination with respect to whether the recording reservation data stored in the memory is the past data or not has been made on the basis of the date as a reference, however, the invention is not limited to such a method. It is also possible to discriminate more accurately on the basis of both the date and the time as references.

(C) Description of display patterns

When VTR 2 is initially purchased, when the battery of remote control unit 1 is replaced, or when the user wants to previously reserve the recording of a future TV program in the coming few months, the date data in the year/month/day display section 25 must be reset. The updating of the date data is mainly executed by operating day/day of the week key 31. When the date data is updated by day/day of the week key 31, the plus(+) end portion of key 31 is pressed to increase the numerals of the date data and the digits of the numerals must be changed in accordance with the order of day to month to year. Therefore, it takes a long time to update the date data. To eliminate such a drawback, it is taught by the present invention to display the date data in year/month/day display section 25 at a high speed during this update process. On the other hand, when the display content of the date data is changed at a high speed, the following conditions must be satisfied.

(1) The rate at which the display can be changed is limited by the software of microcomputer 3, for example, it can only be changed every 45 milliseconds.

(2) Because data displayed at a display time of every 45 msec can be visually followed, if numerals are merely displayed the problem remains due to the difference in display speed and the speed at which signals are output from microcomputer 10. Therefore, numerals cannot be simply displayed as they are.

(3) If the display time of the month display section, 40 of FIG. 4, is set to a longer time, for example 180 msec, the user will feel that such a display time is slow, so that a long display time is also not practical.

To satisfy the foregoing three limiting conditions, four display timings corresponding to the time intervals when day display section 42 changes are set every 45 msec for a period of time corresponding to 180 msec when one month is counted. The display patterns as shown in FIGS. 7A-7G and FIGS. 8A-8G are respectively continuously displayed with such display timing of four times the 45 millisecond limit. In this way, the display is executed as if the date from the first day (1) to the last day (31) and the days of the week from Monday to Sunday are continuously displayed at a high speed.

Seven different kinds of segment patterns are shown by the hatched portions in FIGS. 7A-7G as the display patterns for day display section 42 in year/month/day display section 25.

The segment patterns are determined in the following manner.

(1) When numerals 0 to 9 are displayed, display segments 38 to be driven are controlled in frequency and display time by microcomputer 10.

(2) In the case where the numerals 0 to 9 are sequentially displayed, for instance, the driving frequency of each display segment 38 and the driving time interval are controlled by microcomputer 10.

On the basis of the data obtained in the above times (1) and (2), abstract segment patterns, as shown in FIGS. 7A-7G for example, similar to numerals are constructed.

By continuously displaying the segment patterns in accordance with the order of A to B to C to . . . F to G back to A to . . . every 45 msec, it is possible to enable the user to observe the numerals as if the least significant digit in the day display section 42 periodically changes over a range from 0 to 9 and the most significant digit periodically changes over a range from 0 to 3. Therefore, it is possible to enable the user to observe the numerals as if a whole day display section 42 continuously displays the days from 1 to 30, or 31, at a high high speed the period (180 msec) when the month display section 40 is incremented once.

On the other hand, there are seven different kinds of days of the week patterns shown in FIGS. 8A-8G for display on day of the week display section 29, when a fast change is required. These different days of the week patterns are determined in the following manner.

(1) Among the displays of the days of the week comprising Sunday, Monday, Tuesday, . . . , Friday, and Saturday arranged annularly, the adjacent days of the week constitute one set and two sets, for example, a pair of MON and TUE and another pair of THURS and FRI, as shown in FIG. 8A, are displayed.

(2) Next, days that were not displayed are provided between the respective sets that were displayed, that is, the days corresponding to WED, SAT, and SUN in the example of FIG. 8A are displayed, for example, WED and SAT are displayed in FIG. 8B.

(3) Further, between the adjacent successive display patterns, some of the days of the week that were displayed are overlapped or duplicated, such as TUE and FRI in the examples of FIGS. 8A and 8B.

In a manner similar to the foregoing seven different segment patterns for the days of the week are displayed in accordance with the order of A to B to C to . . . to F to G back to A to . . . Thus, it is possible to enable the user to observe the days of the week as if the display content of day of the week display section 29 periodically and continuously changes at a high speed in correspondence to the change of day (date) display section 42.

As described above, because the date and the day of the week are changed by a specialized set of segment display patterns and day of the week patterns shown in FIGS. 7A-7G and 8A-8G, respectively, it is possible to make it appear to the user that the numerals and characters continuously change without actually needing all of the character and numerical value changing processes. The microcomputer can execute not only the processes to display the changing date and day of the week but also can execute other processes.

On the other hand, because it is possible to enable the user to observe the data as if the date and the day of the week were actually continuously changing at a high speed, no unnatural feeling is caused in the sequential state changes of the display of the date and the day of the week.

Although the number of segment patterns and the number of days of the week patterns in day display section 42 and day of the week display section 29, respectively, have been set to seven patterns, the invention is not limited to this number. The number of patterns can be increased or decreased or the patterns themselves can be changed.

(D) Description of the date setting operation by the remote control unit

As described above in regard to FIG. 4, when VTR 2 was initially purchased, when the battery of remote control unit 1 was replaced, or when the user wants to previously reserve the recording of a future TV program after a few months, the date data in display section 25 must be newly reset. To update the date data, cover 15 of remote control unit 1 is opened, time adjusting key 37 is first pressed, and day/day of the week key 31 is then pressed. By continuously pressing the plus (+) end portion of key 31, the display of year/month/day display section 25 changes at a high speed. In correspondence thereto, the display speed of day of the week display section 29 also increases. At this time, the foregoing segment patterns of FIGS. 7A-7G and the days of the week patterns of FIGS. 8A-8G are continuously displayed at a high speed.

When the display data approaches the desired date data, the high speed display operation as mentioned above is stopped, the date and the day of the week are adjusted by operating day/day of the week key 31, and the desired date data is set. On the other hand, if the user wants to change other data such as the start time, the end time, the channel, or the like in addition to the date data, the data is reset by pressing the corresponding key.

When pressing transfer key 35 after that, an indication of the transfer operation is displayed at display 30 and the date data and the other reset data is transmitted to VTR 2 and stored in both of remote control unit 1 and VTR 2. On the other hand, when cover 15 is closed without pressing transfer key 35, the date data is stored only in remote control unit 1.

According to an aspect of the present invention, when the reservation data stored is a date past the present date, the reservation date is automatically changed to the nearest future date of the same day of the week. Therefore, in a manner different than the conventional methods the recording reservation data is reset by the wireless remote control transmitter having a backup function and there is the advantage such that the complicated operations typically required to correct the past reservation date by the key operations can be simplified and reduced. On the other hand, although the every week reserving function is known, if it is not used a complicated recording operation and recording reservation must be executed each time recording is required. Nevertheless, according to an aspect of the present invention, the updating of the reservation date and the setting of the new recording reservation data can be extremely easily executed, so that there is an advantage in that the complicated recording reserving operations can be substantially reduced. The operating efficiency can be greatly improved by those advantages. Furthermore, every week recording reservation can be substantially executed and the recording reservation date in the VTR is erased simultaneously, with the completion of the recording. Therefore, there is an advantage such that it is possible to eliminate the situation such that a part of the memory area of the main memory in the VTR is always occupied, as in the conventional case where the every week reservation was utilized.

According to an aspect of the present invention, a plurality of display patterns are repetitively displayed at a predetermined period constituting the display of the date or the day of the week, so that there is an advantage such that it is possible to enable the user to observe the date or the day of the week as if it were being periodically and continuously changed at a high speed. Because the date and the day of the week are changed using special display patterns, it is possible to express a situation such that the numerals and characters continuously and sequentially change without requiring the actual character and numerical processes necessary to effect such continuous, sequential change. This provides the advantage such that the microcomputer can execute not only the processes to display the date and the day of the week but also other processes as well. On the other hand, because the date and the day of the week are changed by the change of special display patterns, there is an advantage such that the invention can be applied to a system whose processing speed is slow or an apparatus having no microcomputer. Further, since it is possible to enable the user to observe the date and the day of the week as if they continuously change at a high speed, there is an advantage such that no unnatural feeling is caused in the user upon the changing state of the display of the date and the day of the week.

Although the preferred embodiment has been shown and described above, the present invention is not limited to the foregoing embodiment and many modifications and variations are possible within the spirit and scope of the invention, as set forth in the appended claims.

What is claimed is:

1. A timer programming apparatus that outputs a predetermined signal for controlling a device, comprising:
   a hand-held, remote control unit for controlling the device;
   memory means arranged in said remote control unit for storing a reserved date;
   means arranged in said remote control unit for comparing said reserved date with a present date and for changing the reserved date stored in said memory means to a nearest future date of the same day of the week as said reserved date, both when said means for comparing determines that the reserved date and the present date coincide and when said means for comparing determines that the reserved date is older than the present date; and
   means for transmitting the reserved date to the device following operation of said means for comparing and for changing.

2. An apparatus according to claim 1, wherein said memory means includes means for providing said reserved date and said present date, respectively, as day and time information.

3. An apparatus according to claim 2, wherein said memory means includes means for storing said reserved date as start information and end information.

4. An apparatus according to claim 1, further comprising a date display section including segmented display elements arranged in said remote control unit, in which each segment thereof is controllably energized, for displaying date data and wherein said means for comparing and for changing includes means for setting the date display section to a desired date and means for controlling the energization of the segments to form a plurality of pattern displays that are sequentially displayed until said date display is set to said desired date.

5. An apparatus according to claim 4, further comprising day of the week display section arranged in said remote control unit, in which each day display thereof is controllably energized, for displaying day of the week data, and wherein said memory means stores a calendar having the days of the week corresponding to the dates of said calendar and said means for comparing and for changing includes means for controlling the energization of each day display to form a plurality of pattern displays that are sequentially displayed until said date display is set to said desired date.

6. An apparatus for controlling a device for recording or reproducing an information signal based upon a reserved date, comprising:
   a hand-held, remote control unit for controlling the device;
   memory means arranged in said remote control unit for storing the reserved date;
   means arranged in said remote control unit for comparing said reserved date with a present date and for changing the date stored in said memory means to a nearest future date of the same day of the week as the reserved data when a comparison by said means for comparing indicates that the reserved date and the present date coincide and when a comparison by said means for comparing indicates that the reserved date is older than the present date; and
   means for transmitting the reserved date to the device following operation of the means for comparing and for changing.

7. An apparatus according to claim 6, wherein said memory means includes means for providing said reserved date and said present date as day and time information.

8. An apparatus according to claim 7, wherein said memory means includes means for storing said reserved date as start information and end information.

9. An apparatus according to claim 8, wherein said means for storing said start information and said end information includes means for dividing said information into day, hour, and minute information.

10. An apparatus according to claim 6, further comprising a date display section arranged in said remote control unit including segmented display elements, in which each segment thereof is controllably energized, for displaying date data and wherein said means for changing includes means for setting the date display section to a desired date and means for comparing and for controlling the energization of the segments to form a plurality of pattern displays that are sequentially displayed until said date display is set to said desired date.

11. An apparatus according to claim 4, further comprising a day of the week display section arranged in said remote control unit, in which each day display thereof is controllably energized, for displaying day of the week data, and wherein said memory means stores a calendar having the days of the week corresponding to the dates of said calendar and said means for changing includes means for controlling the energization of each day display to form a plurality of pattern displays that are sequentially displayed until said date display is set to said desired date.

12. A method of setting a device to operate at a predetermined time, comprising the steps of:
   operating a remote control unit of the device to store a reserved date in a memory arranged in the remote control unit;
   determining the present date;
   comparing the reserved date stored in the remote control unit with the determined present date;
   changing the reserved date stored in the memory to the nearest future date of the same day of the week as the reserved data when it is determined in the step of comparing that the reserved date and the future date coincide or when it is determined in the step of comparing that the reserved date is older than the determined present date; and transmitting the changed reserved date to the device, thereby for setting the device to operate at the changed reserved date.

13. The method according to claim 12, further comprising the step of displaying on the remote control unit the reserved date and the present date as day and time information.

14. The method according to claim 12, further comprising the steps of:

displaying the reserved date on the remote control unit using a date display section formed of segmented display elements;

setting the date display section to a desired date in response to said steps of comparing and changing;

controlling the energization of the segments for forming a plurality of pattern displays; and sequentially displaying the pattern displays until the date display is set to the desired date.

15. The method according to claim 14, further comprising the steps of:

displaying in the remote control unit the day of the week using a display section formed of segmented display elements;

storing in a memory in the remote control unit the days of the week corresponding to a calendar;

controlling the energization of the segments for forming a plurality of pattern displays; and setting the day of the week display to a desired day of the week by sequentially displaying the pattern displays until the day of the week display is set to the desired day of the week.

* * * * *